(12) United States Patent
Marcigot et al.

(10) Patent No.: US 10,914,400 B2
(45) Date of Patent: Feb. 9, 2021

(54) APPARATUS FOR THE CONTROLLED DELIVERY OF A GAS FROM A CONTAINER, AND CORRESPONDING DELIVERY METHOD

(71) Applicant: PAYGO ENERGY INC., Ft Worth, TX (US)

(72) Inventors: Fausto Marcigot, Omagh (GB); Michael Oliver Hahn, Seattle, WA (US); Mark O'Keefe, Tynemouth (GB); Laura Talsma, Rotterdam (NL); Nicholas Joel Quintong, San Leandro, CA (US)

(73) Assignee: PAYGO ENERGY INC., Ft Worth, TX (US)

( * ) Notice: Subject to any disclaimer, the term of this patent is extended or adjusted under 35 U.S.C. 154(b) by 310 days.

(21) Appl. No.: 16/072,484

(22) PCT Filed: Jan. 26, 2017

(86) PCT No.: PCT/IB2017/000033
§ 371 (c)(1),
(2) Date: Jul. 24, 2018

(87) PCT Pub. No.: WO2017/130052
PCT Pub. Date: Aug. 3, 2017

(65) Prior Publication Data
US 2020/0318756 A1 Oct. 8, 2020

(30) Foreign Application Priority Data
Jan. 26, 2016 (IT) .................. 102016000007616

(51) Int. Cl.
*F16K 37/00* (2006.01)
*F16K 1/30* (2006.01)
(Continued)

(52) U.S. Cl.
CPC ............ *F16K 37/005* (2013.01); *F16K 1/306* (2013.01); *F16K 35/06* (2013.01); *F17C 13/025* (2013.01);
(Continued)

(58) Field of Classification Search
CPC . F16K 1/30; F16K 1/306; F16K 35/06; F16K 37/005; F17C 2205/0326; F17C 2205/0338; Y10T 137/7761; G01F 15/003
See application file for complete search history.

(56) References Cited

U.S. PATENT DOCUMENTS 3,651,989 A * 3/1972 Westrich .............. B67D 1/0855
222/14
4,988,014 A * 1/1991 Varghese .................. F17C 3/08
220/560.1
(Continued)

FOREIGN PATENT DOCUMENTS

WO 2017/165451 A1 9/2017

OTHER PUBLICATIONS

International Search Report and Written Opinion dated Oct. 10, 2017, from the International Search Authority (US) for International Application No. PCT/IB2017/000033 (filed Jan. 26, 2017), 9 pages.

*Primary Examiner* — Kevin F Murphy
(74) *Attorney, Agent, or Firm* — Rankin, Hill & Clark LLP

(57) ABSTRACT

Apparatus (10) for the controlled delivery of a gas from a mobile container (11) that comprises a connection unit (12) configured to connect a unit, to measure and regulate the flow (35) of the gas to the container (11) and a management unit (32) configured to control and manage the unit to measure and regulate the flow (35), on the basis of information correlated to a quantity of the gas to be delivered.

15 Claims, 10 Drawing Sheets

(51) Int. Cl.
*F16K 35/06* (2006.01)
*F17C 13/02* (2006.01)
*G01F 15/00* (2006.01)
*G05D 7/06* (2006.01)

(52) U.S. Cl.
CPC ......... G01F 15/003 (2013.01); G05D 7/0623 (2013.01); *F17C 2205/0338* (2013.01)

(56) References Cited

U.S. PATENT DOCUMENTS

| | | | |
|---|---|---|---|
| 5,086,806 A * | 2/1992 | Engler | G01F 15/003 |
| | | | 137/486 |
| 5,628,349 A | 5/1997 | Diggins et al. | |
| 5,738,145 A * | 4/1998 | Daicho | F16K 1/305 |
| | | | 137/878 |
| 5,782,263 A * | 7/1998 | Isaacson, Jr. | F16K 17/20 |
| | | | 137/459 |
| 5,944,048 A * | 8/1999 | Bump | G01F 1/6842 |
| | | | 137/486 |
| 7,867,589 B2 * | 1/2011 | DeLay | F17C 3/00 |
| | | | 428/36.91 |
| 7,971,604 B2 * | 7/2011 | McDonald | G05D 7/0623 |
| | | | 137/487.5 |
| 2005/0288873 A1 * | 12/2005 | Urdaneta | G05D 7/0635 |
| | | | 137/487.5 |
| 2010/0059142 A1 | 3/2010 | Denis | |
| 2011/0017318 A1 | 1/2011 | Pisot | |
| 2011/0140850 A1 | 6/2011 | Wassel et al. | |
| 2012/0291878 A1 * | 11/2012 | Pisot | F17C 1/06 |
| | | | 137/315.01 |
| 2014/0174593 A1 | 6/2014 | Ammouri et al. | |
| 2015/0292679 A1 * | 10/2015 | Ehgartner | F17C 13/06 |
| | | | 220/581 |

* cited by examiner

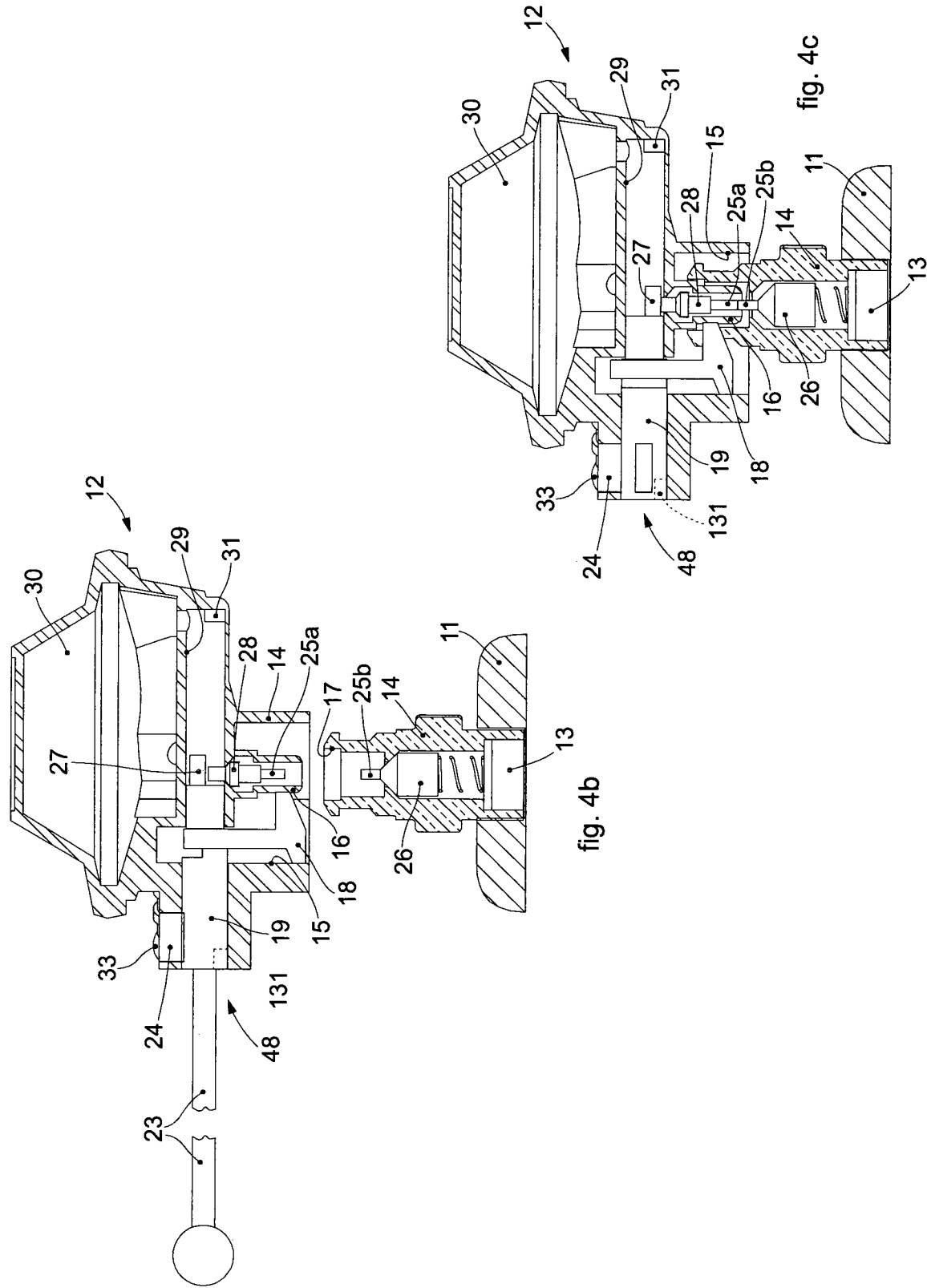

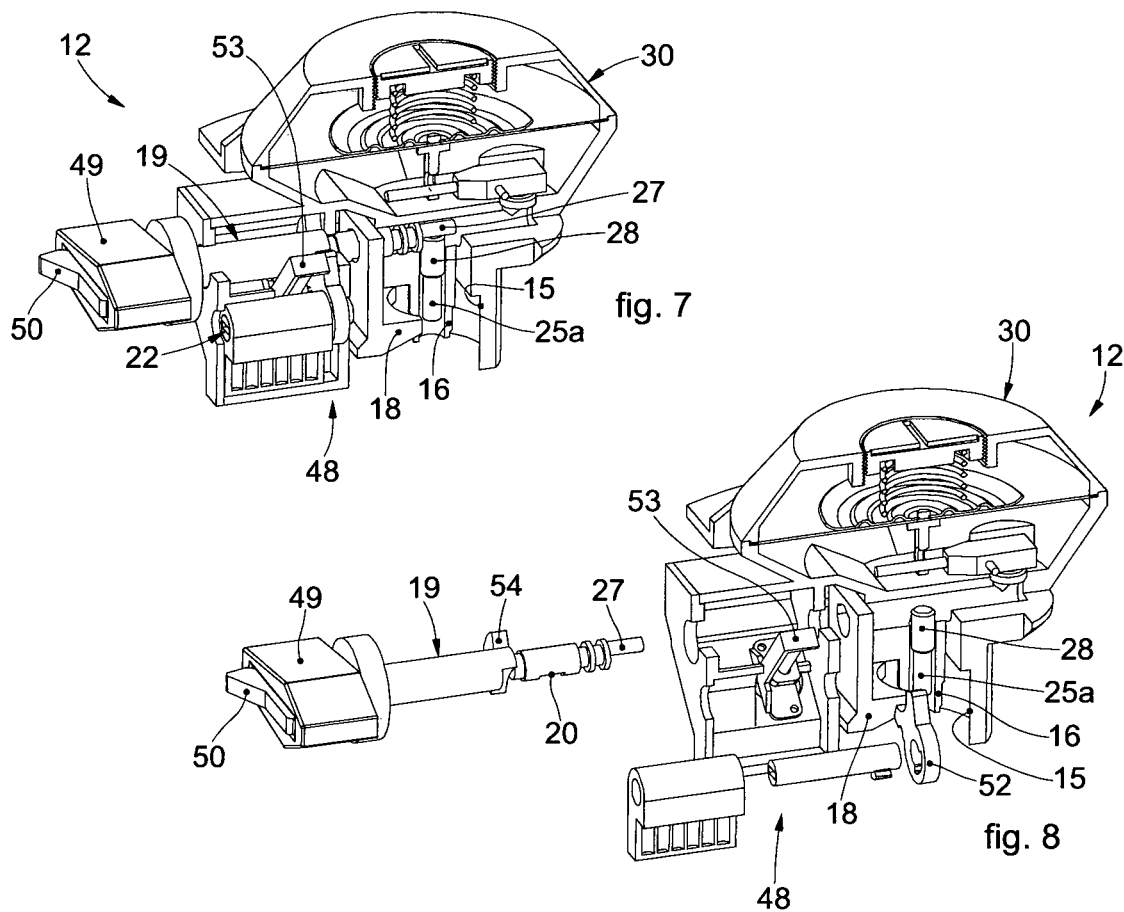
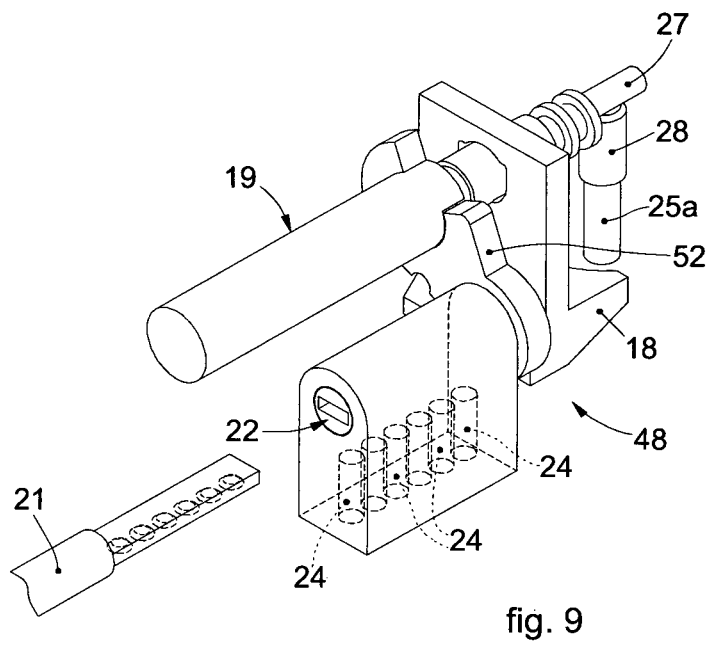

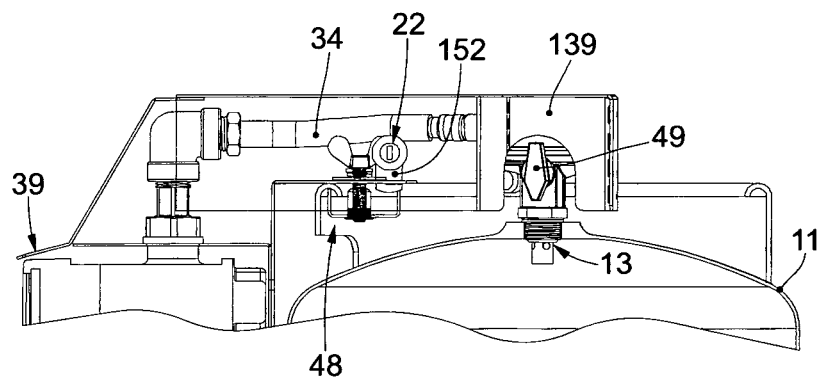
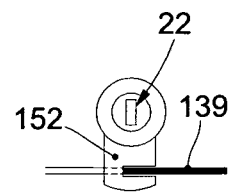
fig. 13a
fig. 13b
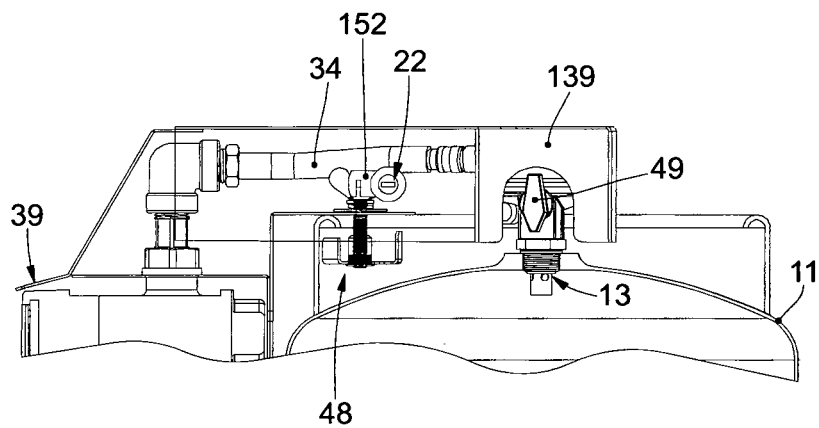
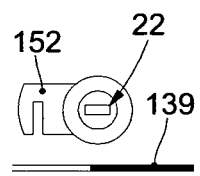
fig. 14a
fig. 14b
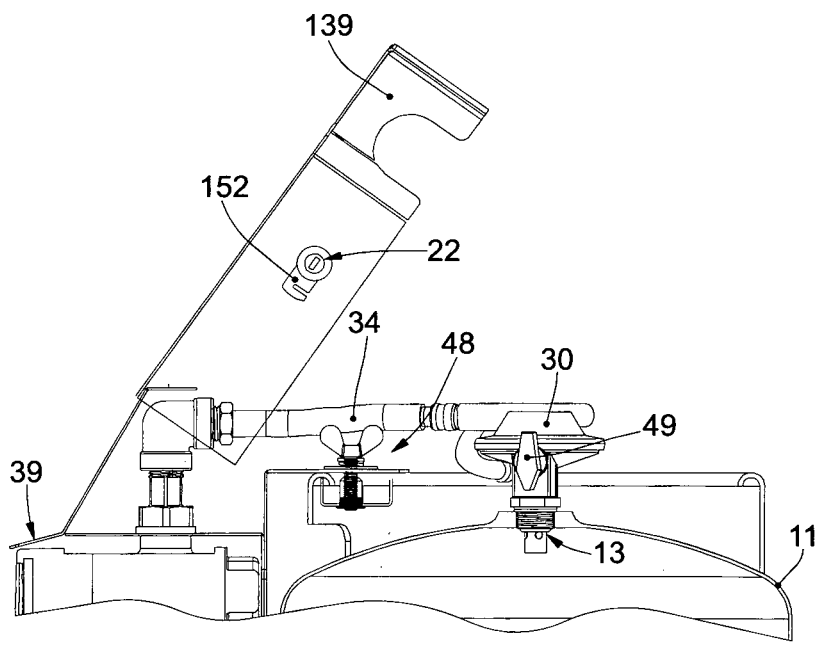
fig. 15

APPARATUS FOR THE CONTROLLED DELIVERY OF A GAS FROM A CONTAINER, AND CORRESPONDING DELIVERY METHOD

RELATED APPLICATIONS

This application is a National Stage under 35 USC 371 of and claims priority to International Application No. PCT/IB2017/000033, filed 26 Jan. 2017, which claims the priority benefit of Italian Application No. 102016000007616, filed 26 Jan. 2016.

FIELD OF THE INVENTION

Embodiments described here concern an apparatus, and the corresponding method, for the controlled delivery of a gas from containers.

In particular, embodiments described here are applied by way of example to containers of a gas, advantageously a gas with a heating and/or cooking function, such as a liquefied petroleum gas (LPG) or natural gas (NG).

Embodiments described here are intended to control and record the gas as it is delivered on each occasion, that is, in the predetermined period as delivered.

BACKGROUND OF THE INVENTION

Gas containers are known, such as for example liquefied petroleum gas (LPG) cylinders, or for other similar combustible gas for domestic or industrial use, in a non-limiting exemplification such cylinders have a gas capacity comprised between 6 kg and 25 kg.

In order to limit the risk of explosions and the costs relating to the transport, such known containers have weights and sizes that do not normally exceed a capacity of 25 kg.

The use of gas containers, especially in developing countries, is known in the form of cylinders, which can be located on each occasion in correspondence with the individual heating and/or cooking units.

However, the adoption of such gas containers remains relatively low.

In the case of use for combustion purposes, the inhabitants of these areas mostly use other fuels for cooking and/or heating their houses, such as for example wood and/or charcoal, and/or kerosene or other similar inefficient fuels.

These known solid and inefficient fuels cause serious damage both to the environment and human health, to such an extent that every year they cause more fatalities than malaria, HIV/AIDS, and tuberculosis combined.

However, known gas containers, and hence also those that contain combustible gases, have a series of problems connected to their delivery means, which are dangerous, expensive and can easily be tampered with by unauthorized persons.

It is also known that such gas containers are subject to numerous thefts and/or illegal refueling which are not only an economic loss for the proprietor and/or the supplier but also entail a considerable risk of explosion and/or uncontrolled leakage of gas, or contamination.

Especially in developing countries, it is known that these gas containers can often have unwanted and difficult to identify leakages of gas, which are not only an economic loss but are also dangerous because of the risk of contamination and/or explosion.

One of the main obstacles to using known gas containers is the high initial cost of investment for the equipment. The cost of the gas container and gas appliance for example, a stove or other device that may use the gas to perform one or more functions, price out most customers in developing countries.

To access gas from gas containers, the user has to pay in advance for the cost of the whole quantity of gas contained in the container, even if the total quantity of gas is used over a long period of time. This makes it difficult for users to afford the use of gas from such gas containers.

It is also known that the infrastructures for delivering the gas, which use standard gas measurers as happens for the supply of gas in Europe and North America, cannot be used in many developing countries due to the lack of suitable infrastructures, security against thefts and tampering, and the costs of installation.

Solutions are known which use systems for measuring the quantity of drinks to be dispensed, mixed and/or introduced inside bottles or other containers, such as those described for example in documents FR-A1-2636135, US-B1-8386072 and US-A1-2013/233887.

However, in the case of liquefied petroleum gases, natural gas, or other compressed and/or combustible gases for heating and/or cooking, these known solutions are completely inadequate both from a safety point of view and also to prevent tampering by unauthorized operators.

Other known solutions, like the one described in document WO-A1-91/06062, provide to use controlled pumping systems of fluids in a chemical plant.

In this case too, this known solution is unusable for the accurate and controlled delivery of gas from a cylinder since such controlled pumping systems cannot be applied to mobile containers.

There is therefore a need to perfect the state of the art and make available an apparatus, and the corresponding method, for the controlled delivery of gas from a container, which overcomes at least one of the disadvantages of the state of the art.

SUMMARY OF THE INVENTION

The present invention is set forth and characterized in the independent claims, while the dependent claims describe other characteristics of the invention or variants to the main inventive idea.

In accordance with the above purposes, embodiments described here concern an apparatus for the controlled and partitioned delivery of a gas present in a mobile gas container According to one embodiment, the apparatus comprises a connection unit configured to connect to the gas container a unit that measures and regulates the flow of the gas from the container to, for example, a stove or other device that may use the gas to perform one or more functions.

According to another embodiment, the apparatus also comprises a management unit configured to control and manage the unit that measures and regulates the flow of gas according to information correlated to a quantity of gas to be delivered. In this way, it is possible to control and manage, using said management unit, the flow of gas through the unit that measures and regulates the flow of gas, advantageously as a function of a signal with information correlated to the quantity of gas to be delivered.

According to some embodiments, the apparatus is associable mechanically and fluidically to existing containers of compressed and/or combustible and/or medical and/or technical gases, in particular mobile gas cylinders with gas capacities that may include for example between 6 kg and 25 kg.

According to some embodiments, said association is conditioned by a connection unit that connects the container to the apparatus, stably but removably.

In particular, in some embodiments, the apparatus can be releasably connected to the gas container via, for example, the connection unit.

According to some embodiments, there is a unit that measures and regulates the flow of the gas to be delivered, governed at least by a management unit, which may be a remote unit, configured to receive a signal with information correlated to the total or periodic quantity of gas to be delivered and to command the unit that measures and regulates the flow of the gas to be delivered.

According to possible embodiments, the unit that measures and regulates the flow of the apparatus may include a delivery valve governed by an electronic module, said delivery valve being comprised in and managed by the management unit.

According to other embodiments, the unit that measures and regulates the flow is also associated with a unit to control the gas actually delivered.

According to possible embodiments, the apparatus can be associated structurally and removably with an existing container by driving an anchoring member to at least two positions defined for example by an actuator member acting on the anchoring member.

According to some embodiments, the apparatus can have security sensors configured to detect any possible forcing of the unit to obtain access thereto by unauthorized operators.

According to other embodiments, the disconnection of the gas container from the apparatus described here can be subjected to the use of suitable and specific security means. Such security means may be de-activated by the management unit. The management unit may operate on the basis of detection means and/or security sensors associated with the apparatus according to the invention.

According to some embodiments, the apparatus comprises a protective element configured not to allow intervention on the components contained therein by an unauthorized operator, subject to de-activating the management unit.

According to possible embodiments, the protective element comprises a mobile protective casing configured to be held in position by a respective clamping element.

According to some embodiments, the apparatus can comprise a user interface associated with the protective element and connected to the management unit, configured to supply the user with information correlated to the quantity of gas and/or allow the selection of specific predefined delivery programs.

According to possible forms of delivery, the apparatus can comprise a clamping element configured to cooperate with said actuator member, or with a connection body connected to it, in order to allow, during use, the actuator member to rotate around its own longitudinal axis so as to allow the delivery or the interruption of the gas.

Some embodiments provide that the clamping element can be positioned in relation to the connection body so as to drive the anchoring member, at the same time preventing the delivery of the gas.

According to possible embodiments, the apparatus can comprise an electronic clamping device able to hold the clamping element in position and to free it after receiving a command signal from the management unit.

According to possible embodiments, the apparatus can comprise manual safety means able to block the rotation of the actuator member.

The present invention also concerns a method for the controlled delivery of a gas that comprises:

supplying a signal with information correlated to the quantity of gas acquired and to be delivered to the management unit;

processing the signal by the management unit to generate a delivery signal;

sending the delivery signal to the unit that measures and regulates the flow;

activating the unit that measures and regulates the flow to deliver a quantity of gas correlated to the delivery signal transmitted by the management unit.

According to a variant, the method also provides to control the actual quantity of gas delivered from the terminal delivery exit by means of a control unit.

BRIEF DESCRIPTION OF THE DRAWINGS

These and other characteristics of the present invention will become apparent from the following description of some embodiments, given as a non-restrictive example with reference to the attached drawings wherein:

FIGS. 4b and 4c show two section views of an apparatus according to the present invention;

FIGS. 7-9 show details of the apparatus in FIG. 5;

FIGS. 13a-15 show the positions of a possible embodiment of a clamping mechanism and a detail of the apparatus in FIG. 11.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME FORMS OF EMBODIMENTS

Figure 1:
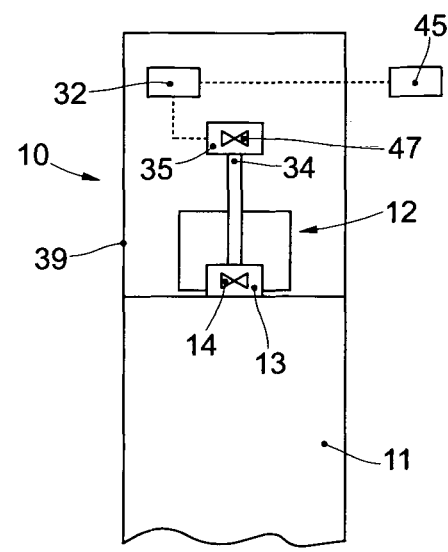
FIG. 1 shows a diagram, given by way of example, of an apparatus according to the present invention.
Figure 2:
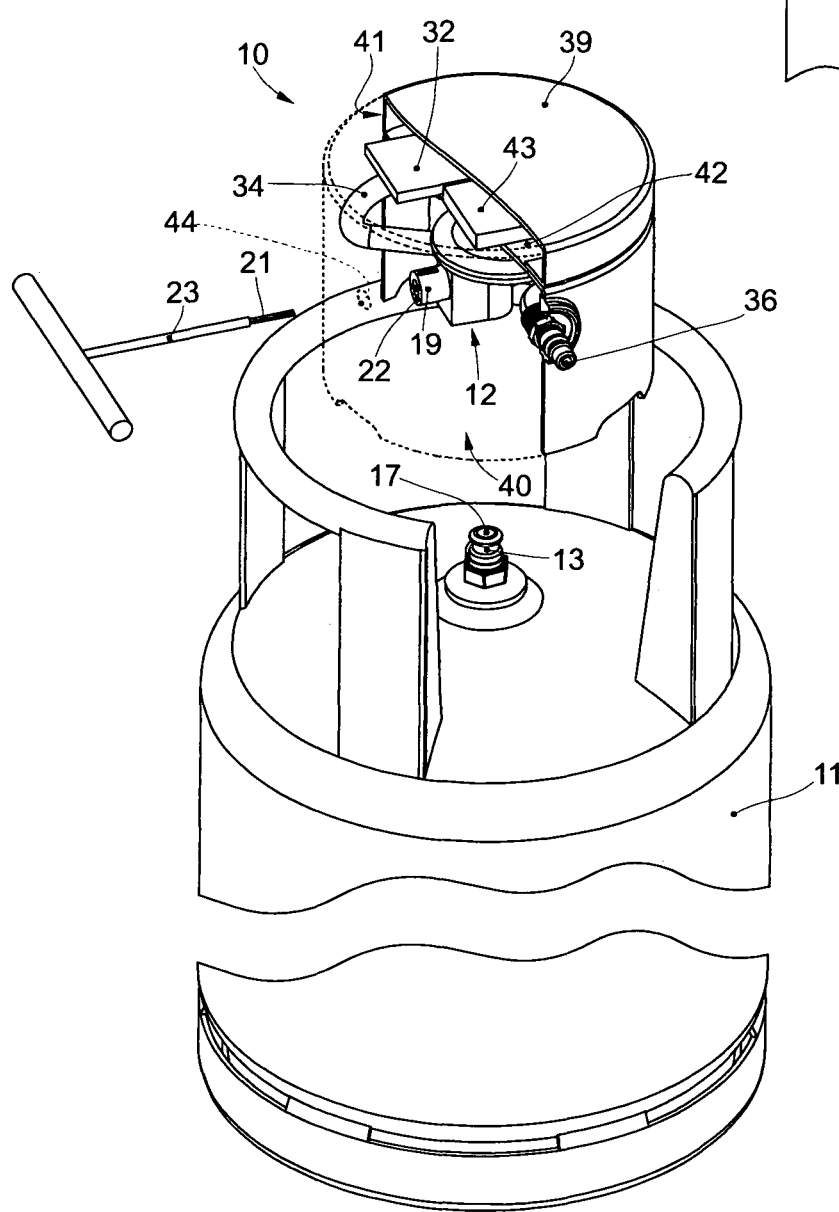
FIG. 2 is a perspective view of an apparatus according to the present invention and a gas container associable therewith.
Figure 3:
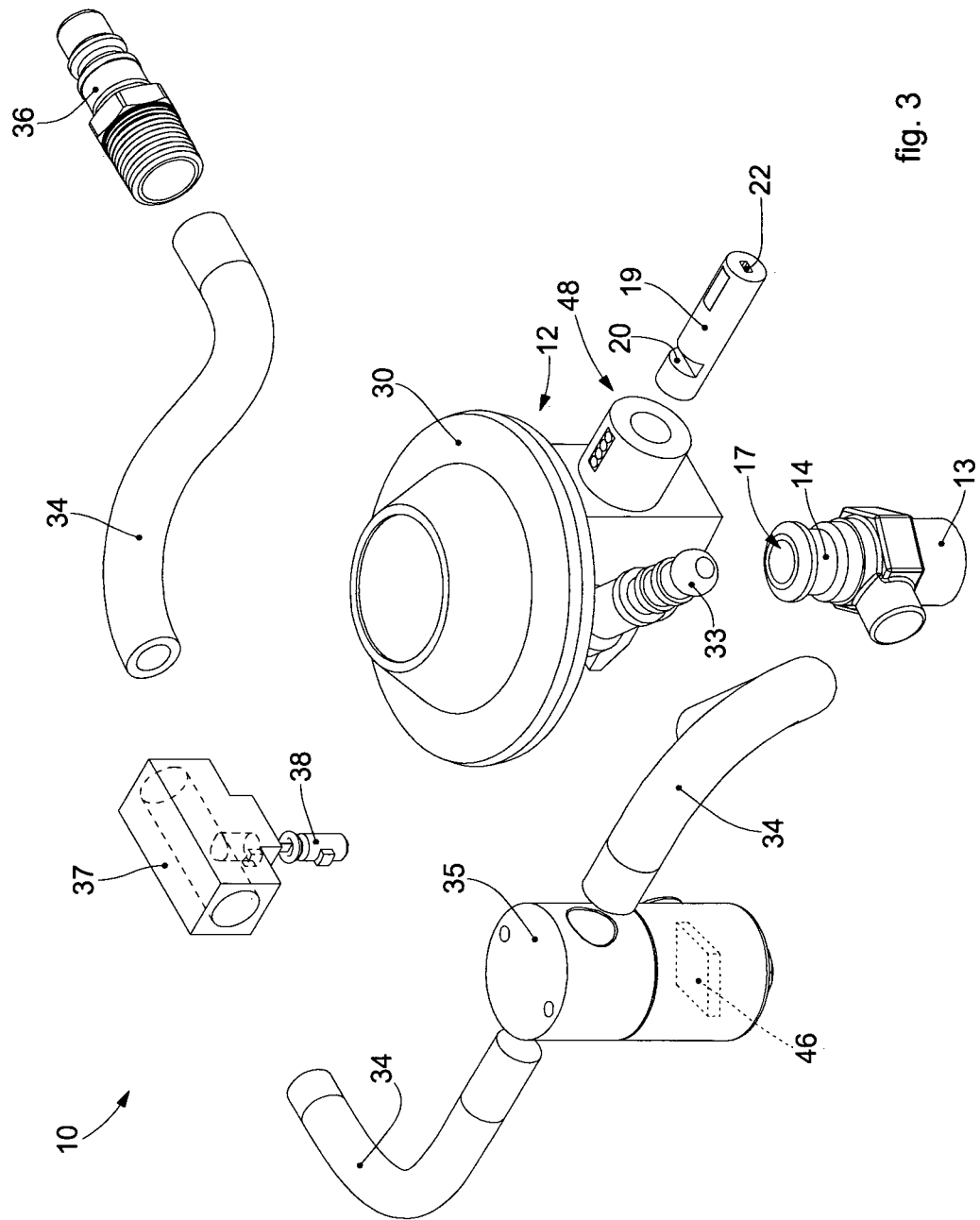
FIG. 3 is an exploded view of an apparatus according to the present invention.

We will now refer in detail to the various embodiments of the invention, of which one or more examples are shown in the attached drawings. Each example is supplied by way of illustration of the invention and shall not be understood as a limitation thereof. For example, the characteristics shown or described inasmuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

One purpose of the present invention is to provide an apparatus 10 to be affixed to a container 11 (e.g. a mobile gas container such as a propane tank or a mobile gas cylinder) holding, for example, LPG, NG, or other compressed and/or combustible gases.

The apparatus 10 may be used to control gas delivery contained within an existing mobile container. The apparatus 10 may serve to, for example, increase a level of security for gas contained within said container 11 by, for example, preventing unauthorized persons from tampering with, stealing from or illegally refilling said containers 11.

The apparatus 10 may also promptly detect possible accidental leakages of gas from said container 11 and may, in some cases, record an amount of gas dispensed from said container 11.

Another purpose of the present invention is to provide a controlled gas delivery apparatus 10 that spreads out, over time, costs associated with dispensing/using the gas stored in the containers 11 for users by facilitating the incremental sale of small quantities of gas from the containers 11, thus creating a pay-as-you-go system which allows the user to access/use the gas only as-needed.

Another purpose of the present invention is to monitor remotely quantities of gas the user has extracted from the cylinder 11 and/or to monitor remotely the delivery of a gas from the cylinder 11 depending on the delivery rate expected on each occasion.

The Applicant has devised, tested and embodied the present invention to overcome the shortcomings of the state of the art and to obtain these and other purposes and advantages.

Embodiments described using the attached drawings concern an apparatus 10 for the controlled delivery of a gas from a known mobile container 11 (also referred to herein as a container 11). According to the embodiments described here and hereafter by the expression "mobile container" we mean that the container can be removed and repositioned as needed, that is, movable and hence can also be portable. For example, a container 11 usable in the embodiments described here can have, by way of example a capacity, that is, it can contain a quantity of gas equal to or less than 25 kg, for example between 6 kg and 25 kg.

By way of non-restrictive example, container 11 may be a cylinder, e.g. made of metal material, composite material, or other suitable material configured to contain and deliver gas, in particular liquefied petroleum gas (LPG), natural gas (NG), propane or other gas used for heating and/or cooking.

Hereafter, to simplify the description, we will refer to gas containers used for example for cooking and/or heating, however the concepts that will be described also extend to technical gases such as for example oxygen, nitrogen etc.

According to some embodiments, combinable with all the embodiments described here, the apparatus 10 comprises a connection unit 12 configured to connect a unit that measures and regulates the flow 35 to the container 11.

In possible implementations, the connection unit 12 is configured both to allow the structural or mechanical association to a deliverer 13 of a container 11 and also to define a fluidic connection of the gas from the container 11 to the apparatus 10.

By way of non-restrictive example, the deliverer 13 can be associated for example with a delivery valve 14, for example a needle valve, mounted by a clip or other type to form a single body such as to allow, once the delivery valve 14 is open, the gas to exit from the container 11.

Moreover, in some embodiments, combinable with all the embodiments described here, the apparatus 10 comprises a management unit 32 configured to control and manage the unit that measures and regulates the flow 35, based on information correlated to a quantity of gas to be delivered.

According to one embodiment, combinable with all the embodiments described here, the connection unit 12 can be provided with a connection member 16 associated with a deliverer 13 of the container 11, by means of an anchoring member 18 with two positions.

Figure 4A:
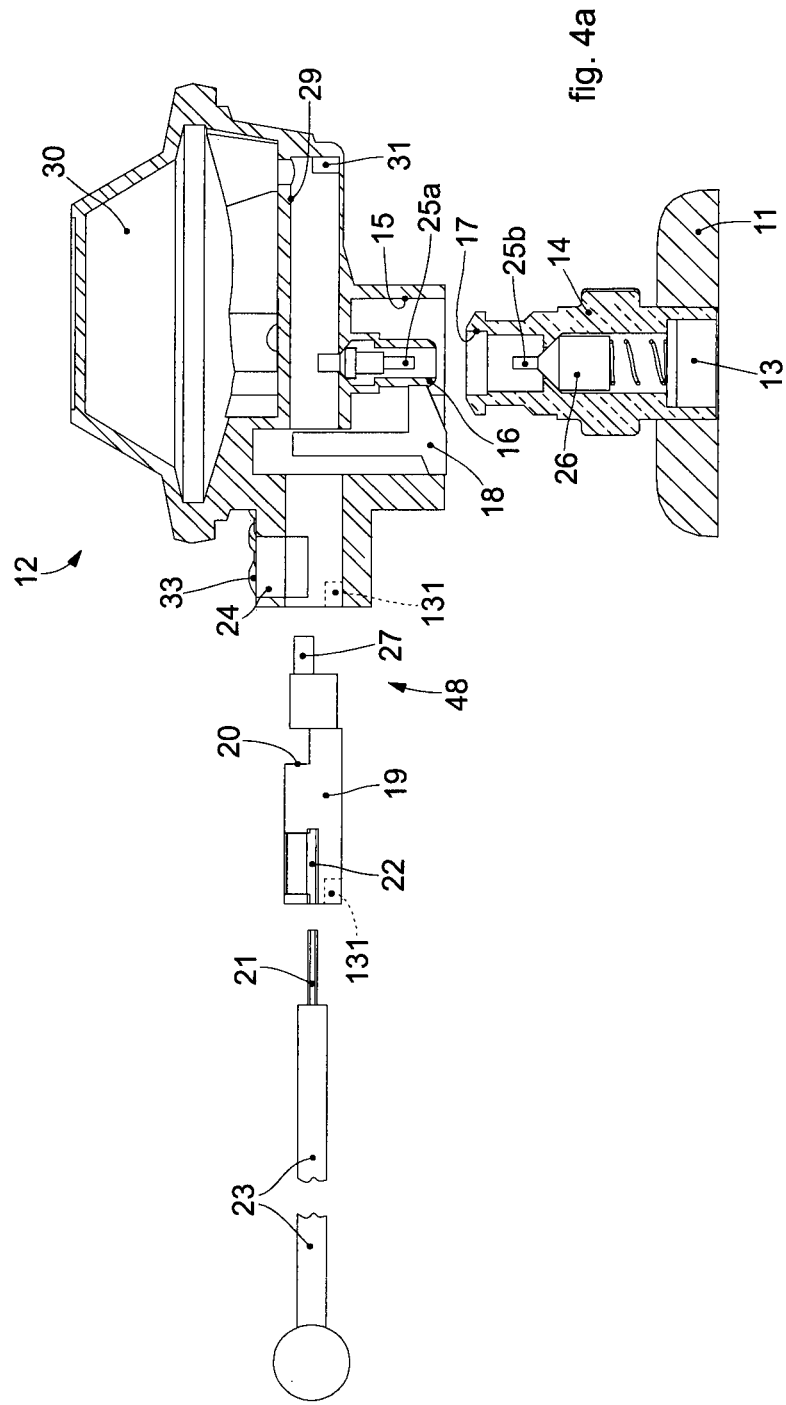
FIG. 4a is an exploded section view of a detail of an apparatus according to the present invention.

According to possible embodiments, for example as shown in FIG. 4a, the connection member 16 can be provided in a connection chamber 15 of the connection unit 12 and can have a section mating with the shape of the delivery exit 17 of the deliverer 13.

In possible implementations, the connection member 16 can be associated structurally with the delivery exit 17 by means of the anchoring member 18, for example, a bolt with a clip-type, snap-in, staple or clamp attachment, or other similar type.

These types of anchoring members 18 enable not only a structural association but also a fluidic connection, i.e. a connection that allows the gas to transit without obstacles from the delivery exit 17 of the container 11 to the delivery apparatus 10.

In particular, according to a possible embodiment, the anchoring member 18 is structurally associated on the external surface of the delivery valve 14 of the deliverer 13 of the container 11 in a position remote from the delivery exit 17 or in any case so as to allow the gas to transit from the container 11 inside the connection member 16.

According to possible embodiments, for example illustrated in FIG. 4a, the apparatus 10 can comprise an actuator element 19 configured to define at least the two positions of the anchoring member 18.

The actuator element 19 can be conditioned by a key 21 connectable to a lock 22 present in the actuator element 19 itself.

According to one embodiment, the structural association of the deliverer 13 to the anchoring member 18 can be carried out by means of the actuator element 19 that is part of the connection unit 12.

According to one embodiment, the actuator element 19 has a groove 20 on its surface, mating in shape with the anchoring member 18.

The anchoring member 18 is associated to form a single body with the actuator element 19 in a zone conformed so as to have an integral association with the groove 20.

The actuator element 19 can rotate around its longitudinal axis so that the anchoring member 18, perpendicularly associated with the longitudinal axis of the actuator element 19, also rotates.

The rotation of the anchoring member 18 allows the deliverer 13 to be inserted inside the connection chamber 15 without obstacles.

In fact, by rotating the anchoring member 18, it is disposed so as to free the entrance of the connection chamber 15 and hence to allow an insertion without obstacles of the delivery exit 17.

According to one embodiment, the actuator element 19 allows to position the anchoring member 18 in two positions: a first position to allow the insertion without obstacles of the deliverer 13 into the connection chamber 15, and a second position to allow the association of the deliverer 13 with the connection member 16.

After having inserted the deliverer 13 in the connection chamber 15, and after having associated the connection member 16 with the delivery exit 17, the anchoring member 18 is rotated again by means of the actuator element 19 so as to obtain a structural association of the anchoring member 18, and hence of the apparatus 10, to the deliverer 13 of the container 11.

According to one embodiment, for example as shown in FIG. 4a, the anchoring member 18 is associated on the external surface of the delivery valve 14 of the deliverer 13.

The actuator element 19 rotates by means of a specific key 21, insertable in a mating lock 22 present in the actuator element 19.

According to one embodiment, the anchoring member 18 is rotated by means of the key 21 which can have an extender element 23 associated with the key 21 so as to form a single body.

According to one embodiment, the extender element 23 is T-shaped, or other similar shape, thanks to which there is a better grip to effectively rotate the key 21 in the lock 22 and hence the actuator element 19 associated with the anchoring member 18.

According to one embodiment, the extender element 23 has an elongated shape so as to be able to insert and rotate the key 21 in the lock 22 from distances comprised between 10 cm and 50 cm.

According to possible embodiments, the apparatus 10 can comprise one or more security pins 24 configured to prevent the rotation of the actuator element 19.

According to one embodiment, in order to secure the association between apparatus 10 and container 11, i.e., so that unauthorized persons cannot tamper with it, as well as the lock 22 that can be activated by means of the key 21 alone, the actuator element 19 has on its surface a seating and/or a slit to allow the insertion and/or association of one or more security pins 24, e.g. a set of security pins.

The security pins 24 are inserted inside the actuator element 19 to prevent it from rotating, and therefore from being removed by unauthorized persons.

Once the security pins 24 are associated, the actuator element 19 cannot be rotated except after the security pins 24 have been removed using the key 21.

In this way, once the deliverer 13 is associated with the apparatus 10, it is not possible to remove the apparatus 10 from the container 11 except by using the key 21.

This increases security against possible thefts and/or tampering by unauthorized persons who, not having the key 21, cannot remove the apparatus 10 from the deliverer 13.

In the drawings, the group comprising the actuator element 19, the anchoring member 18, the security pins 24 and the safety sensors 131 is indicated by the reference number 48, and corresponds all to a possible embodiment of a clamping mechanism (referred to herein as clamping mechanism 48).

According to one embodiment, for example shown in FIG. 4b, to allow a precise association of the delivery exit 17 with the connection member 16, the latter comprises an association element 25a mating with a corresponding association element 25b present inside the deliverer 13.

The association elements 25a, 25b can be connection/attachment elements, such as, for example, a plunger, mechanical fixing means, suction means or other connection/attachment systems.

The association elements 25a, 25b not only supply a reference for the correct association of the connection member 16 and the deliverer 13, but also allow the opening of the delivery valve 14 so that the gas can flow therefrom.

According to one embodiment, for example shown in FIG. 4b, the delivery valve 14 of the deliverer 13 is opened by pushing the shutter element 26 downward, so as to form a free space for the transit of the gas from container 11.

According to one embodiment, for example shown in FIG. 4c, the actuator element 19 has an extension 27 which, once having associated the deliverer 13 to the apparatus 10, allows the opening of the connection valve 28 of the connection member 16, pushing the shutter of the connection valve 28 downward, which in turn pushes the shutter element 26 of the delivery valve 14 downward.

This also allows the automatic opening of the delivery valve 14 of the deliverer 13, and hence allows the gas to exit from the deliverer 13, to pass through the connection member 16 and to enter inside a regulation chamber 29 located downstream of the connection member 16.

According to one embodiment, the regulation chamber 29 is associated with a control element 30 able to monitor the pressure of the gas transiting in the regulation chamber 29.

The control element 30 has one or more security sensors 31 able to monitor other physical quantities of the gas as well as the pressure, i.e. temperature, composition etc.

The security sensors 31 allow both the identification of possible leakages of gas and the monitoring of how much gas is actually introduced into the apparatus 10.

In the event of a gas leakage, even slight, the security sensor 31 quickly detects the leakage and communicates this to the management unit 32, by means of a signal, for example electric and/or computerized.

By way of example, the management unit 32 can be a microcontroller, an integrated circuit, an electronic board, or other similar device.

According to one embodiment, the management unit 32 comprises an electronic device for the reception, processing and transmission of a signal, for example electric, computerized, or other similar type with information correlated to the quantity of gas to be delivered.

According to one embodiment, the management unit 32 has data reception/transmission devices at least from the delivery valves comprised in the apparatus 10 and from the security sensors 31.

According to one embodiment, other security sensors 131 are also provided, associated with the actuator element 19, which are able to detect possible mechanical stresses generated during any possible forcing by unauthorized persons to remove and/or tamper with the apparatus 10 and/or the container 11.

For example, the security sensor 131 can detect mechanical stresses at least on the connection unit 12 and/or on the gas container 11.

According to this latter embodiment, for example shown in FIG. 1, the security sensors 31 cooperate with the management unit 32 in the same way as the security sensor 31 of the control element 30, sending an alarm signal to a device 45, such as for example a telephone, a terminal or other similar means to the proprietor of the container 11 and/or the supplier, if the presence of possible unauthorized subjects or forcing and/or tampering is detected.

Furthermore, the management unit 32 is configured to send the data collected by the security sensors 31 and 131 to, for example, one or more devices 45, the proprietors of the container 11, and/or the suppliers thereof.

According to one embodiment, if there is an intervention on the container 11 by unauthorized persons, the management unit 32 communicates an alarm via, for example, an on-board alarm mechanism (e.g. speaker or display pad) and/or transmission of a signal to a remote device (e.g. cell phone, computer or pager) that may be operated by, for example, the proprietor of container 11 and/or a supplier thereof and/or device 45.

In this way, it is possible to warn the people concerned quickly, so that they can intervene to stop thefts and/or tampering by unauthorized persons on the apparatus 10 and/or the container 11.

According to one embodiment, for example illustrated in FIG. 4c, the regulation chamber 29 comprised in the connection unit 12 provides an exit 33 associated mechanically and fluidically by means of a connection pipe 34, also comprised in the connection unit 12, to the unit that measures and regulates the flow 35 of the gas.

Therefore, according to embodiments described here, the unit that measures and regulates the flow 35 is configured to deliver a quantity of gas depending on a signal with information correlated to said quantity of gas.

The information often is transmitted by means of a signal to the unit that measures and regulates the flow 35 after being processed by the management unit 32 which in turn has received the signal with the correlated information from a device 45.

According to one embodiment, the unit that measures and regulates the flow 35 is associated by means of a connection pipe 34 to the connection unit 12 so as to have both a mechanical and fluidic association with the gas container 11.

According to one embodiment, the unit that measures and regulates the flow 35 of the gas can comprise a delivery valve 47 governed by an electronic module 46, comprised in the unit that measures and regulates the flow 35 and managed by the management unit 32. For example, the electronic module 46 can be separate from the delivery valve 47 or integrated with it, and may be configured to drive the opening and closing of the delivery valve 47.

According to some embodiments, the unit that measures and regulates the flow 35 of the gas enables regulation of the flow of gas in a controlled manner and also the partitioned delivery of the gas according to the quantities needed by the user on each occasion.

In particular, the unit that measures and regulates the flow 35 of the gas can be configured to receive an electric and/or computerized signal or similar, such as to open the delivery valve 47 of the unit that measures and regulates the flow 35 for a transit time and section defined according to the user's needs.

According to one embodiment, the management unit 32 is configured to receive a signal from the outside, sent by way of example by a device 45 such as a cell phone, or a terminal or other similar device, and to transmit it in turn to the unit that measures and regulates the flow 35 of the gas.

According to one embodiment, the possibility of partitioning the quantities of gas delivered allows the final user to pay for only the quantity necessary on each occasion, without having to pay for the overall cost of the gas contained in the container 11.

According to one embodiment, the management unit 32, based on the signal received and if there is the quantity of gas purchased present inside the container 11, is configured to command, and indeed during normal functioning does command, the opening of the delivery valve 47 of the unit that measures and regulates the flow 35 for a transit time and section such as to define the volume of gas purchased that is to be delivered.

According to one embodiment, the speed of the gas delivered is constant and known by means of the security sensors 31; however, in the event of variable speed of the gas, the volume of gas purchased is calculated by multiplying the transit section by the sum of the speed of the gas and the time for which the delivery valve 47 of the unit that measures and regulates the flow 35 is kept open.

According to this embodiment, in the event that the required quantity of gas is not present, the management unit 32 does not command the delivery valve of the unit that measures and regulates the flow 35 to open, and sends a message to the user and/or to the supplier to signal the need to recharge the gas in the container 11.

According to a preferential embodiment, if the gas is below a threshold that can be defined by the supplier, the management unit 32 sends a message to the user and/or to the supplier to signal, with adequate notice, the need to recharge the gas in the container 11 and/or replace the container 11.

The method enables monitoring of the quantity of gas available and also the purchasing of the quantities of gas needed by the user on each occasion.

By controlling and managing the quantities actually used by each individual user, and the data relating to his/her specific user habits, the entity that supplies the container 11 and/or the gas is able to personalize the service and costs for each individual user.

In some instances, this allows the entity to budget in time for the intervention of an authorized operator to refuel the gas in the container 11 and/or for the maintenance of the apparatus 10.

In the case of gas containers 11 used in medical and/or scientific laboratories, the method allows for the partitioning, monitoring and/or managing of the flow of gas from container 11 depending on the specific operating conditions of the apparatuses to which container 11 may be supplying gas.

The method also allows for the notification of a gas refilling and/or container 11 replacement service when a volume/mass of gas remaining in container 11 falls below a threshold amount.

Furthermore, the method also allows for the preparation of the apparatuses coupled to a container 11 that are under pressure remotely and, in some instances, before the operator of the apparatus needs to use the apparatus (e.g., arrives in the laboratory including the apparatus) so as to, for example, optimize time spent in the laboratory.

According to one embodiment, the unit that measures and regulates the flow 35 of the gas is connected by means of one or more connection pipes 34 to a terminal delivery exit 36 of the apparatus 10.

The terminal delivery exit 36 allows for the delivery of a partitioned volume/mass of gas to the user's machine(s) connected thereto. Exemplary, machines include, but are not limited to LPG cookers, pressurized apparatuses and/or other apparatuses to which the present invention is connected.

According to one embodiment, a control unit 37 is positioned between the connection pipes 34, and has one or more sensors 38, such as for example a flow sensor, a mass sensor, a temperature sensor, a pressure sensor, and/or other sensors.

The control unit 37 allows for monitoring the correct and actual delivery of the gas through the apparatus 10 upstream of the delivery valve of the unit that measures and regulates the flow 35 of the gas.

According to some embodiments, the apparatus 10 can comprise a protective element 39, provided with an aperture 44 to allow association of the key 21 with the lock 22.

For example, the protective element 39 can be made in a single body, or can comprise one or more mobile protective casings 139 that may be, removably connected and held in position by a respective clamping element 152.

According to possible embodiments, the protective element 39 and the mobile protective casing 139 can be made of metal or other material resistant to external stresses and, in some embodiments, weather or atmospheric conditions, and may serve to not only protect the components of the apparatus 10 from possible stresses, weather damage, unauthorized interventions, but also advantageously provide two compartments.

A first compartment 40 is provided in which there are the components configured to receive, monitor, physically manage and deliver the flow of gas from the container 11 to the terminal delivery exit 36 at exit from the apparatus 10.

A second compartment 41, physically separated from the first compartment 40 by means of a separation plate 42, contains the management unit 32 and the feed 43 of the management unit 32.

According to one embodiment, the management unit 32 also provides an anti-theft geolocation device, that may be configured to communicate with, for example, a GPS satellite system or similar device able to identify whether the apparatus 10, and hence the gas container 11 connected thereto, are, for example, transported outside a controlled area defined by the supplier, inside which the apparatus 10 is to be kept.

According to one embodiment, the management unit 32 sends an alarm signal to, for example, device 45 and/or device controlled by the user and/or supplier of the container 11 every time the geolocation device detects that the apparatus 10 has left the controlled area.

According to one embodiment, the second compartment 41 is accessible exclusively from inside the protective element 39 by removing the separation plate 42 so as to prevent any intervention by unauthorized persons.

According to one embodiment, before being able to remove the protective element 39, it is possible to deactivate the security sensors 131 by sending a computerized signal, or other type of signal, to the management unit 32, if the person is authorized.

The protective element 39 can be removed after the security pins 24 have been de-activated by inserting the key 21 in the lock 22 through an aperture 44 present on the protective element 39.

The aperture 44 is conformed and disposed so that the key 21 can be inserted inside the protective element 39 and introduced inside the lock 22.

If the person is not authorized, and therefore the security sensors 131 are still active, this operation is detected by the security sensor or sensors 131 associated with the actuator element 19, which in turn communicate this to the management unit 32 which sends an alarm signal to, for example, the proprietor and/or the supplier of the gas container 11.

If the key 21 was not the correct one, and a different key 21 was detected, the management unit 32 would activate the alarm, given that the operation is being performed by a non-authorized operator.

According to one embodiment, the two compartments 40, 41 are physically separate so that the circuitry of the management unit 32 and/or feed 43 and/or possible sparks caused by the electronic components cannot come into contact with the other components that physically manage the flow of gas.

According to some embodiments described here, the method to deliver the gas of the apparatus 10 associated with the container 11 comprises:

supplying a signal correlated to the quantity of the gas to be delivered to the management unit 32, sent for example by means of a device 45, such as a cell phone or other similar device;

processing the signal received by the management unit 32 to generate a delivery signal;

sending the delivery signal from the management unit 32 to the unit that measures and regulates the flow 35 of the gas connected by means of the connection unit 12 to the container 11;

activating the unit that measures and regulates the flow 35 to deliver a quantity of gas correlated to the delivery signal transmitted by the management unit 32;

possibly controlling the actual quantity of gas delivered from the terminal delivery exit 36 to a user machine, such as, for example, a cooking hob, or stove, by means of the control unit 37.

Figure 5:
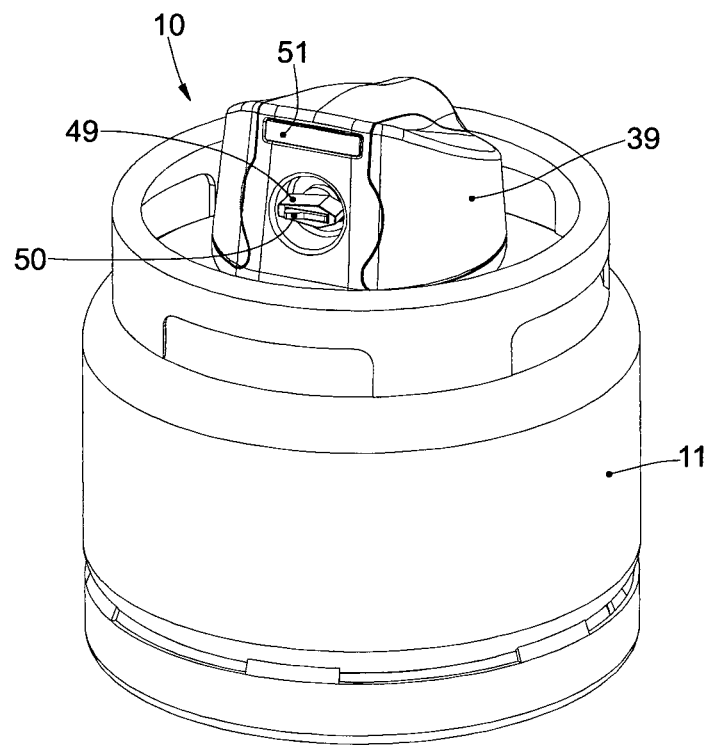
FIG. 5 is a perspective view of an apparatus according to a possible embodiment of the present invention and a gas container associable with it.
Figure 6:
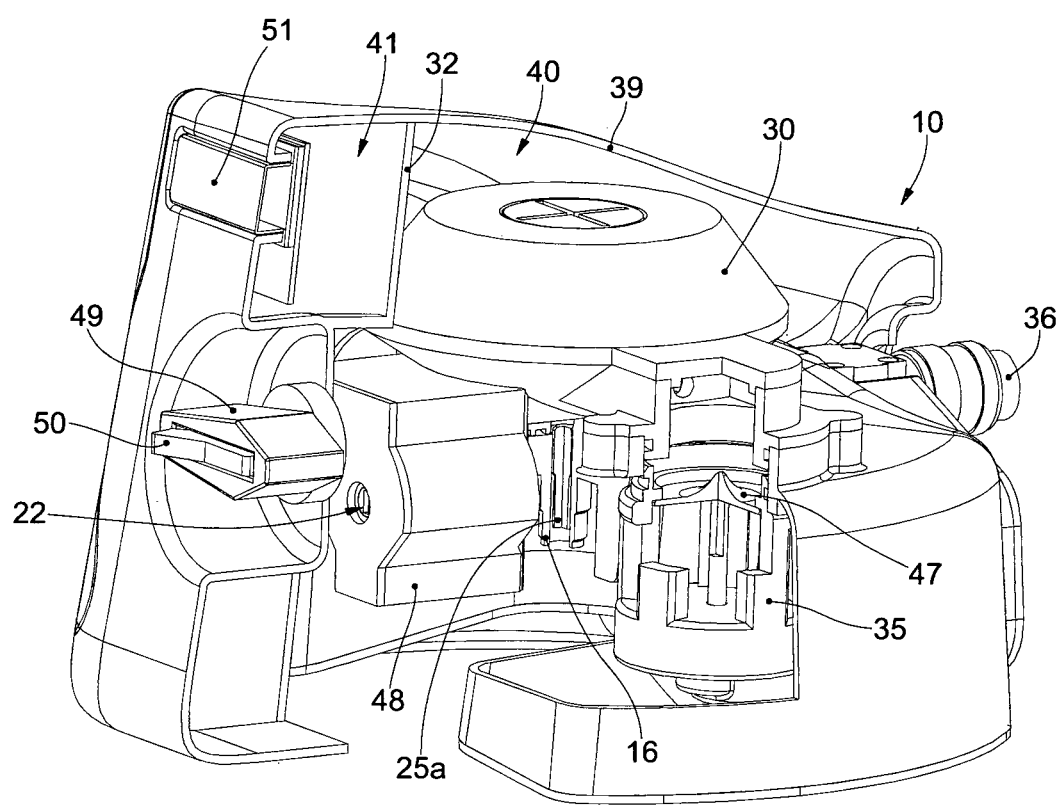
FIG. 6 is a perspective view of the apparatus in FIG. 5, partly in section.

According to possible embodiments, shown in FIGS. 5 and 6, the apparatus can comprise a handle 49 connected to the actuator member 19, that is, in the case shown here by way of example, an actuator member 19 having an extension 27 eccentric with respect to the axis of the actuator member 19 itself.

The eccentric extension 27 cooperates with the connection valve 28 to allow the gas to transit from the mobile container 11 to the regulation chamber 29.

According to possible variants, the handle 49 can comprise a manual safety mechanism 50 able to block the rotation of the handle 49 and hence of the actuator member 19. This is provided to prevent an accidental (e.g. due to a child's interference) rotates the actuator member 19.

According to possible embodiments, a user interface 51 can be provided on the protective element 39, connected to the management unit 32 so that the user can see the information correlated to the quantity of gas delivered, or other correlated information, useful for managing his/her consumption.

The user interface 51 is also configured to allow the user to select the quantity of gas to be delivered in a period of time, or to select specific predefined delivery programs.

According to possible embodiments, the apparatus 10 can comprise a clamping element 52 configured to cooperate with the actuator member 19, or with a connection body 54 connected to it, in order to allow, during use, the actuator member 19 to rotate around its own longitudinal axis for a rotation portion defined to allow the delivery or the interruption of the gas.

According to possible embodiments, the clamping element 52 is configured to be positioned in relation to the connection body 54 so as to allow the actuator member 19 to drive the anchoring member 18 while, at the same time, preventing the delivery of the gas.

According to possible embodiments, shown in FIGS. 7-9, the connection unit has a clamping mechanism 48 with an actuator member 19 that is constrained in position, or limited in its movement, by the clamping element 52.

The clamping element 52 is provided with a lock 22 and is driven by the key 21 and has a shape mating with the body of the actuator member 19, or one of its components, or a connection body 54 connected to the actuator member 19 and shaped so as to cooperate with the clamping element 52.

In particular, with reference to FIGS. 10a-10d, possible embodiments are shown of a clamping element 52 cooperating with the actuator member 19, or the connection body 54 in the various positions.

Figure 10A:
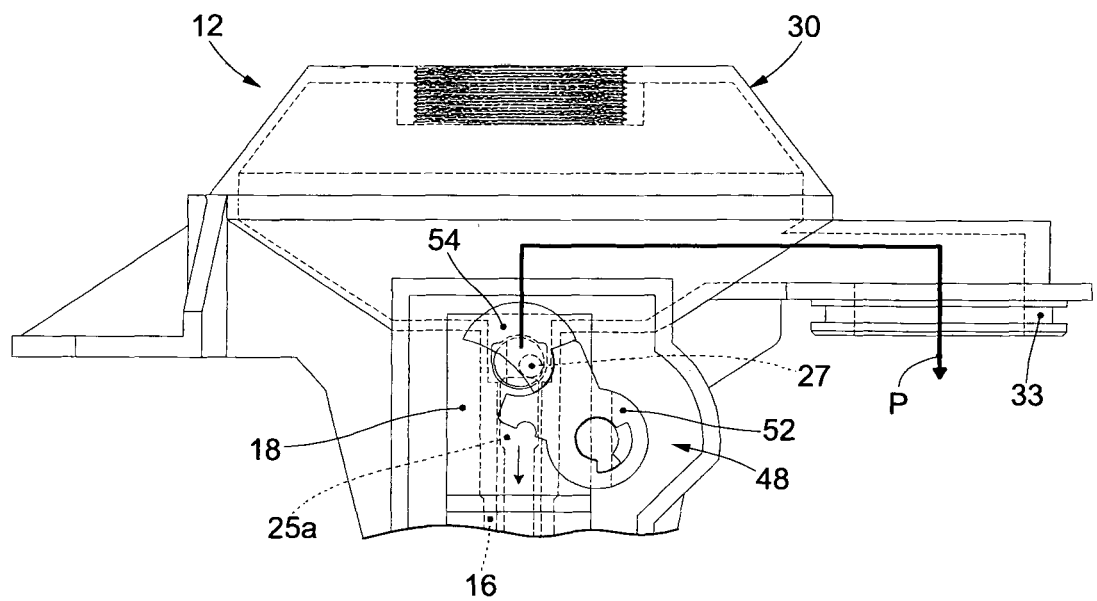
FIGS. 10a-10d show the positions of a possible embodiment of a clamping mechanism of the apparatus in FIG. 5.
Figure 10B:
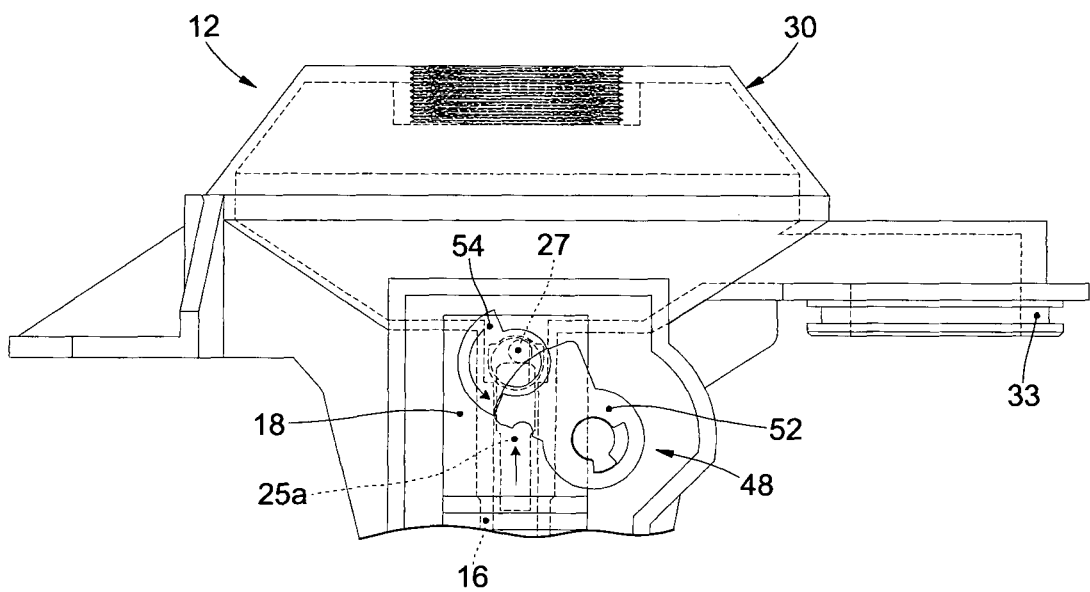

With reference to FIGS. 10a-10b, the clamping element 52 has a shape such that, when it is associated with the actuator member 19 and clamped in position by the key 21, it allows the actuator member 19 to rotate around its own longitudinal axis for a rotation portion defined so as to allow the closing valve 28 to open/close, that is, to deliver or interrupt the flow of gas.

FIG. 10a shows the open configuration of the closing valve 28 and the travel of the gas is indicated by P.

Figure 10C:
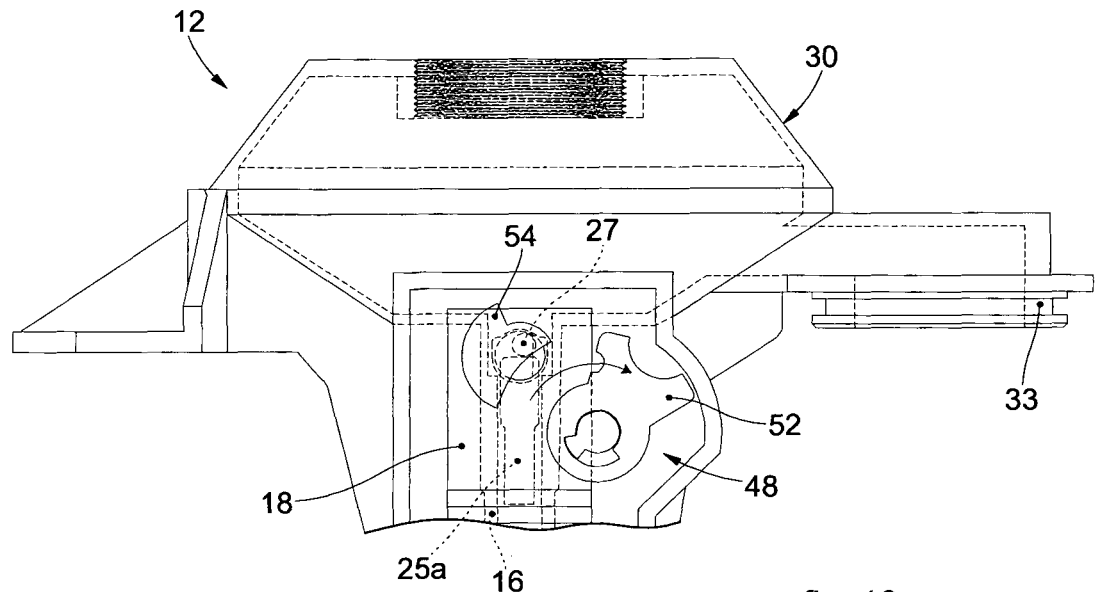
Figure 10D:
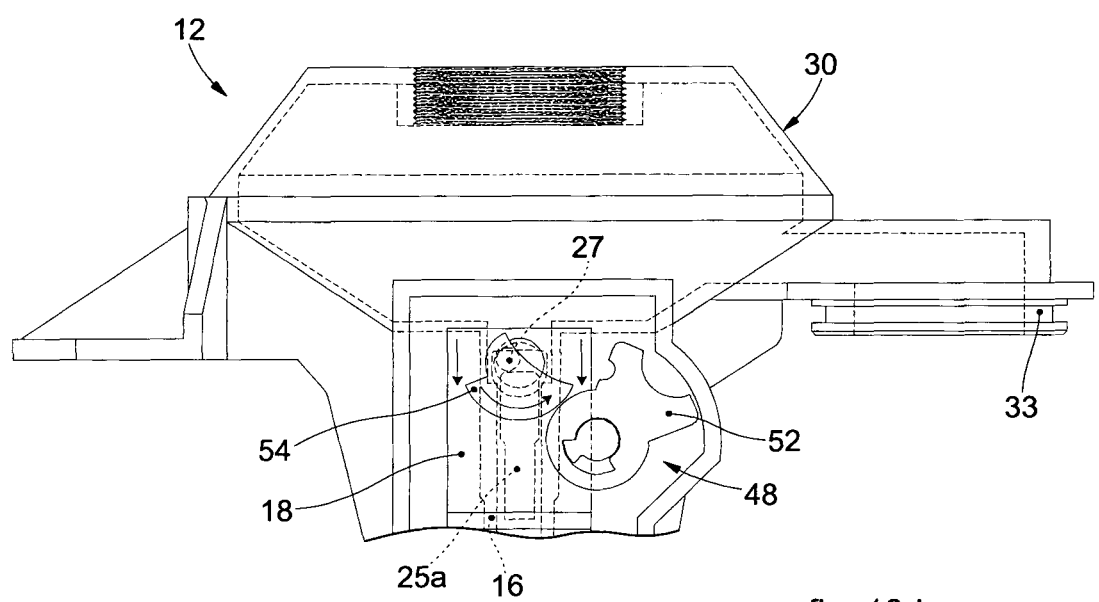

With reference to FIGS. 10c-10d, the clamping element 52 can be rotated by the key 21 so as to allow release of the anchoring member 18 and hence the connection unit 12 from the container 11, at the same time keeping the actuator member 19 clamped in the position where the closing valve 28 is closed.

According to possible embodiments, the apparatus 10 can comprise an electronic clamping device 53 able to hold the clamping element 52 in position and to free it after receiving a command signal from the management unit 32.

According to possible embodiments, the clamping element 52 can provide security sensors 131, not shown, configured to detect possible forcing by unauthorized persons and/or to be associated with an electronic clamping device 53 able to hold the clamping element 52 in position and to free it only after receiving a command signal from the management unit 32.

Figure 11:
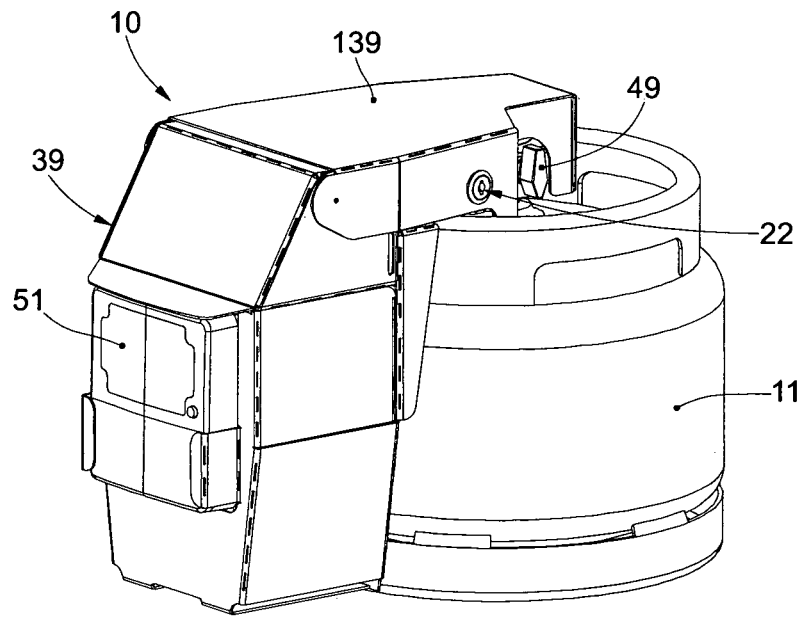
FIG. 11 is a perspective view of an apparatus according to another embodiment of the present invention and a gas container associable with it.
Figure 12:
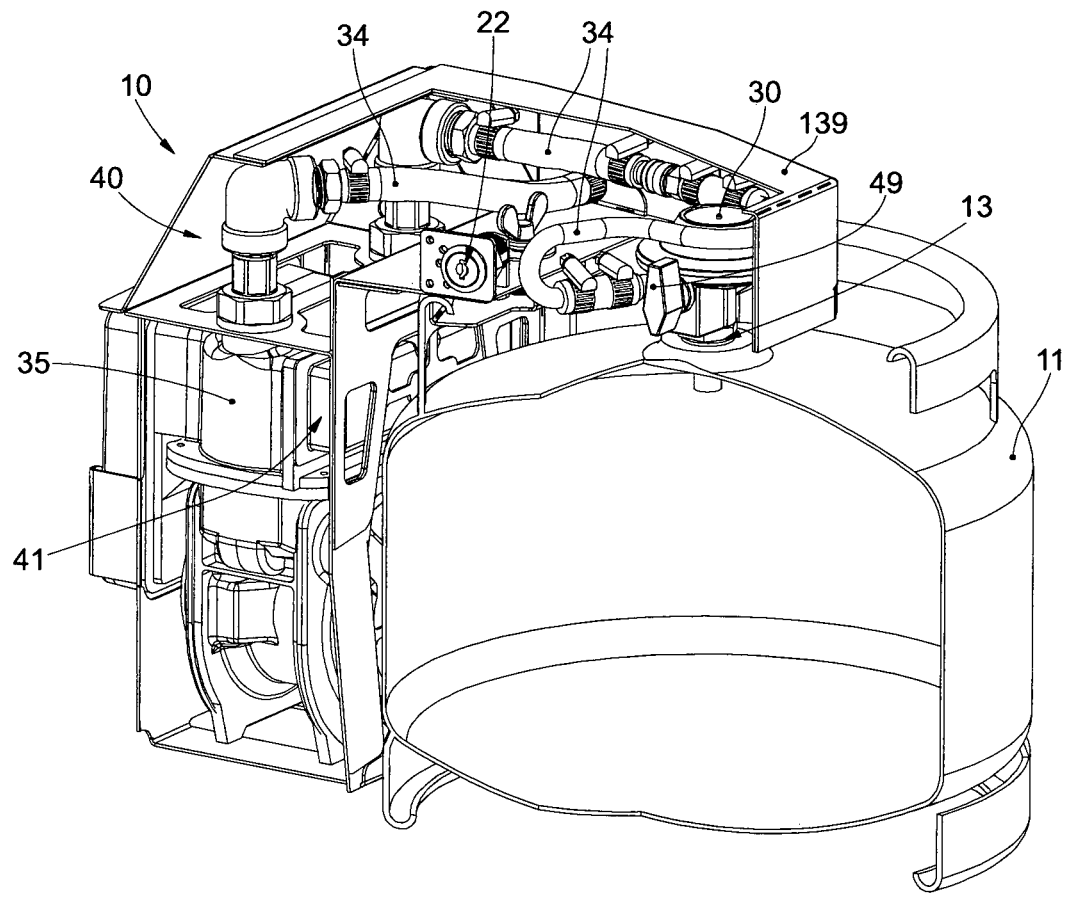
FIG. 12 is a perspective view of the apparatus in FIG. 11, partly in section.

According to possible embodiments, shown in FIGS. 11 and 12, the gas delivery apparatus 10 can be connected directly to the delivery valve 14 of the container 11.

In this case, the delivery of the gas is managed and controlled by the unit that measures and regulates the flow 35 located downstream of the regulation chamber 29, or the control element 30.

With reference to FIGS. 13a-15, by driving another clamping element 152, a mobile protective casing 139 of the protective element 39 is released, so as to make it possible for an operator to access at least part of the first compartment 40.

In particular, in this configuration, the clamping mechanism 48 comprises an elastic mechanism that cooperates with the other clamping element 152 and possibly with part of the container 11 to hold the mobile protective casing 139 in position, which can be pivoted to a fixed portion of the protective element 39.

This solution, which implements a clamping element 152 to hold the mobile protective casing 139, can be implemented in combination with other embodiments described, such as for example the embodiment that provides the use a clamping element 52 to allow the actuator member 19 to drive the anchoring member 18 while, at the same time, preventing the delivery of gas.

It is clear that modifications and/or additions of parts may be made to the apparatus for the controlled delivery of a gas from a container and the corresponding method as described heretofore, without departing from the field and scope of the present invention. It is also clear that, although the present invention has been described with reference to some specific examples, a person of skill in the art shall certainly be able to achieve many other equivalent forms of apparatus for the controlled delivery of a gas from a container and the corresponding method, having the characteristics as set forth in the claims and hence all coming within the field of protection defined thereby.

In the following claims, the sole purpose of the reference numbers is to facilitate reading: they must not be considered as restrictive factors with regard to the field of protection claimed in the specific claims.

The invention claimed is:

1. An apparatus for the controlled delivery of a gas from a mobile container, said apparatus comprising:
   a gas flow measurement and regulation unit configured to measure and regulate a flow of the gas from the mobile container;
   a connection unit configured to connect the gas flow measurement and regulation unit to said mobile container, said connection unit including a connection member associated with a deliverer of the mobile container by an anchoring member with two positions;
   a management unit coupled to the gas flow measurement and regulation unit, the management unit being configured to control and manage said gas flow measurement and regulation unit, wherein said gas flow measurement and regulation unit in turn measures and regulates the gas flow, on the basis of information correlated to a quantity of said gas to be delivered; and
   an actuator element configured to define said two positions of said anchoring member, said actuator element being conditioned by a key connectable to a lock present in said actuator element.

2. The apparatus of claim 1, wherein the gas flow measurement and regulation unit comprises a delivery valve governed by an electronic module, resident in the gas flow measurement and regulation unit, the electronic module being managed by said management unit.

3. The apparatus of claim 1, further comprising:
   one or more security pins configured to prevent a rotation of said actuator element.

4. The apparatus of claim 1, wherein said actuator element comprises a security sensor configured to detect mechanical stresses on at least one of said connection unit and said mobile container of said gas.

5. The apparatus of claim 4, wherein said management unit is configured to receive one or more signals from said security sensor and send an alarm signal.

6. The apparatus of claim 1, further comprising: an external protective element provided with an aperture to allow the association of said key with said lock.

7. The apparatus of claim 6, further comprising:
   a user interface associated with said protective element and connected to said management unit, the user interface being configured to allow the selection of specific predefined gas delivery programs and supply the user with information correlated to at least one of the quantity of gas contained the mobile container, a quantity of gas that has flowed from the mobile container.

8. The apparatus of claim 6, wherein said protective element comprises a mobile protective casing configured to be held in position by a respective clamping element.

9. The apparatus of claim 1, further comprising:
   a clamping element configured to cooperate with at least one of said actuator element and a connection body connected to said actuator element in order to allow, during use, said actuator element to rotate around its own longitudinal axis for a rotation portion defined so as to allow at least one of the delivery of the gas and an interruption of the delivery of the gas.

10. The apparatus of claim 9, wherein said clamping element is configured to be positioned in relation to said connection body so as to allow said actuator element to drive said anchoring member while preventing the delivery of the gas.

11. The apparatus of claim 9 further comprising:
an electronic clamping device configured to hold said clamping element in position and to free said clamping element responsively to receiving a command signal from said management unit.

12. The apparatus of claim 1, further comprising:
a handle connected to said actuator element and having a manual safety mechanism able to block the rotation of said handle and said actuator element.

13. The apparatus of claim 1, wherein said mobile container is a cylinder made of metal or a composite material, with a capacity comprised between 6 kg and 25 kg of gas.

14. A method for the controlled delivery of a gas from a mobile container comprising:
supplying a signal correlated to a quantity of a gas to be delivered to a management unit;
processing said signal by said management unit to generate a delivery signal;
transmitting said delivery signal to a gas flow measurement and regulation unit connected by a connection unit to said mobile container; said connecting unit including a connection member associated with a deliverer of the mobile container by an anchoring member with two positions;
activating said gas flow measurement and regulation unit to deliver a quantity of said gas correlated to said delivery signal transmitted by said management unit; and
defining said two positions of said anchoring member by an actuator element, and conditioning said actuator element by a key connectable to a lock present in said actuator element.

15. The method of claim 14, further comprising:
controlling the actual quantity of gas delivered from a terminal delivery exit downstream of said gas flow measurement and regulation unit using a control unit positioned between the gas flow measurement and regulation unit and the terminal delivery exit.

* * * * *